C. H. BROWN.
DIFFERENTIAL.
APPLICATION FILED APR. 26, 1917.
1,294,040.
Patented Feb. 11, 1919.
2 SHEETS—SHEET 2.
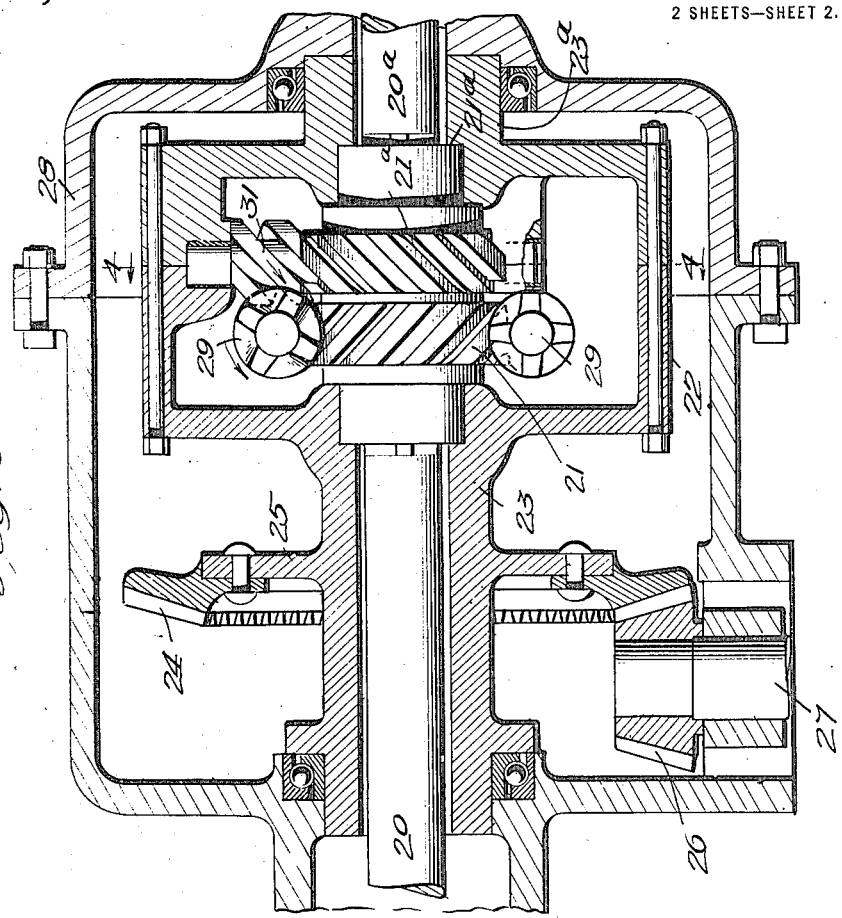
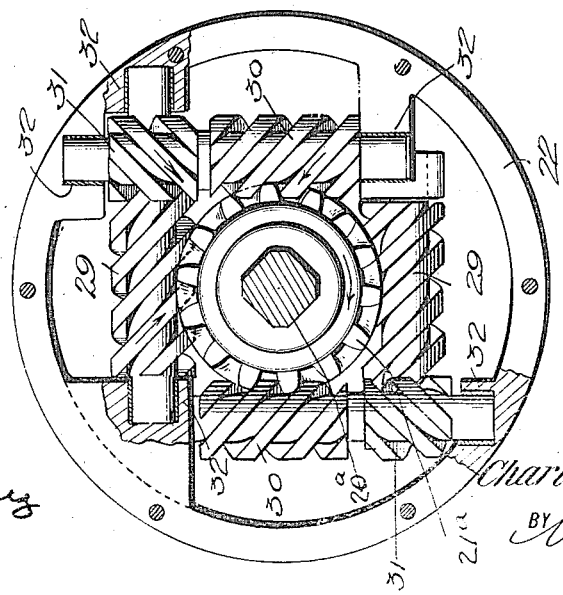
WITNESSES
INVENTOR
Charles H. Brown
BY
ATTORNEYS

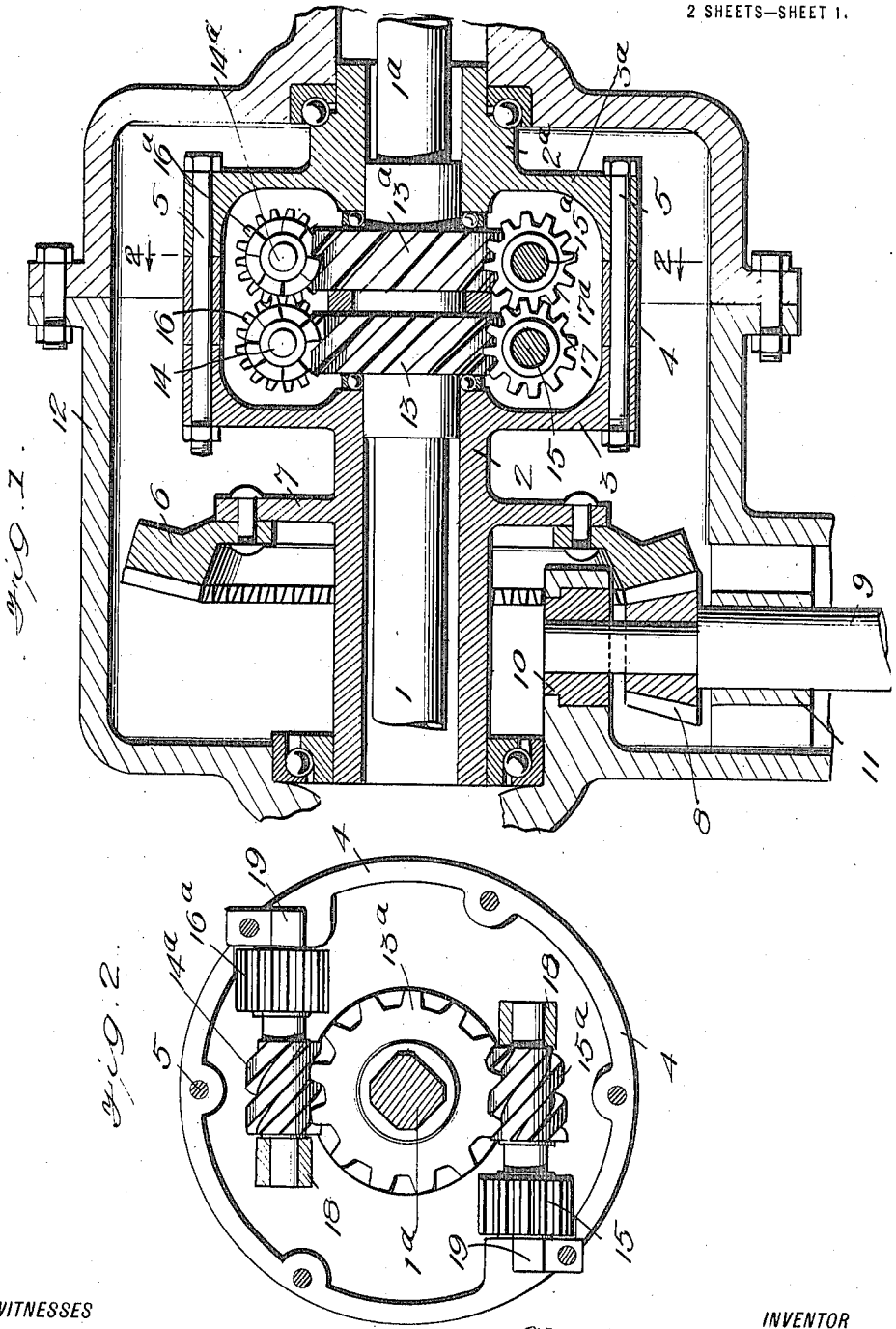

UNITED STATES PATENT OFFICE.

CHARLES HENRY BROWN, OF EL PASO, TEXAS.

DIFFERENTIAL.

1,294,040.

Specification of Letters Patent. Patented Feb. 11, 1919.

Application filed April 26, 1917. Serial No. 164,593.

*To all whom it may concern:*

Be it known that I, CHARLES HENRY BROWN, a citizen of the United States, and a resident of El Paso, in the county of El Paso and State of Texas, have invented an Improvement in Differentials, of which the following is a specification.

My invention is an improvement in differentials for motor vehicles and the like, and has for its object to provide a device of the character specified, wherein the sections of the axle are connected by a worm gear to permit a slow differential movement without undue resistance, while turning a corner, for instance, but which will prevent the axle sections from turning readily with respect to each other.

In the drawings:

Figure 1 is a longitudinal section of the improved differential.

Fig. 2 is a section on the line 2—2 of Fig. 1, looking in the direction of the arrows adjacent to the line.

Fig. 3 is a view similar to Fig. 1 of a modified form.

Fig. 4 is a section on the line 4—4 of Fig. 3.

In the embodiment of the invention shown in Figs. 1 and 2, the axle sections 1 and $1^a$ are journaled in housings 2 and $2^a$ in the form of hollow shafts, and each of these housings is provided at its inner end with an enlargement 3 and $3^a$, respectively, and these enlargements coöperate with each other and with a ring 4 to form a housing. The enlargements and the ring are connected by bolts and nuts 5, and a bevel gear ring 6 is secured to a radial rib 7 on the housing section 2.

This gear ring meshes with a bevel pinion 8 secured to the driving shaft 9, which is journaled in bearings 10 and 11 in the sectional housing or gear casing 12 which incloses the differential. The housing sections 2 and $2^a$ are journaled in the casing 12 with ball bearings, as shown, and the differential connection is arranged within the casing formed by the enlargements 3 and $3^a$ and the ring 4.

Worm wheels 13 and $13^a$ are secured to the axle sections 1 and $1^a$, respectively, and these worm wheels, as shown, are threaded in the same direction. Worm shafts 14, $14^a$, 15, $15^a$ are journaled in the housing 3—4, at right angles to the axle, and the worms 14 and 15 mesh with the worm wheel 13, while the worm shafts $14^a$ and $15^a$ mesh with the worm wheel $13^a$. The worm wheels are arranged adjacent each other, and the shafts 14 and $14^a$ are arranged directly opposite the shafts 15 and $15^a$. The shafts 14 and $14^a$ have pinions 16 and $16^a$ which intermesh, and the shafts 15 and $15^a$ have similar intermeshing pinions 17 and $17^a$. The shafts 14—$14^a$ and 15—$15^a$ are journaled in bearings 18 and 19 in the differential casing 3—4.

In the embodiment of the invention shown in Figs. 3 and 4, the axle sections 20 and $20^a$ have worm wheels 21 and $21^a$, respectively, at their inner ends, the said worm wheels being within the differential casing 22, corresponding to the casing 3—4 of Fig. 1. This casing is rigid with the hollow shafts or housing sections 23 and $23^a$, in which the axle sections are journaled. The gear ring 24, corresponding to the ring 6 of Fig. 1 is secured to the radial rib 25 on the housing section 23, and the gear ring meshes with a pinion 26 on the drive shaft 27 journaled in the gear casing 28 corresponding to the gear casing 12.

It will be noticed that the worm gear 21 is a left hand gear, while the gear $21^a$ is a right hand gear. Worm shafts 29 are journaled adjacent to the worm gear 21 and on opposite sides thereof, and the said worms mesh with the gear 21. Other worm shafts each consisting of worm portions 30 and 31 are arranged adjacent to the worm gear $21^a$, and the portion 30 of each of the said worms meshes with the worm gear $21^a$. The worm shafts 29 and 30—31 are arranged at right angles to each other, and the portion 31 of each shaft 30—31, which is a left hand thread, meshes with the adjacent worm shaft 29. The shafts 29 and 30—31 are journaled in bearings 32 in the differential housing.

The operation of the embodiment shown in Figs. 1 and 2 is as follows:

Under normal conditions the axle sections turn as one, the worm gear connection between the sections not readily permitting relative movement of the two sections. However, as in turning a corner, for instance, the section $1^a$, will turn forwardly with respect to the section 1. This will cause the worm shafts 15 and $15^a$ to turn with respect to the shafts 14 and $14^a$, and the axle section 1 may thus turn in the opposite direction to the section $1^a$.

In Figs. 3 and 4 the action is the same. The worm wheels are connected by the worm shafts which are connected with each other through the worms 31, instead of through gear wheels. The worm shafts and the worm gears may be of any pitch desired, it being understood that the pitch is the same in each set. But the fewer the threads and the smaller the pitch, the greater the friction on the differential action, and consequently the more positive the drive to both wheels alike, regardless of road conditions.

I claim:

A differential gearing comprising in combination with the axle sections, a housing in which the sections are journaled, a casing in which the housing is rotatable, means for driving the housing, said housing having an enlargement at the meeting ends of the axle section and the said housing being sectional at the enlargement and the sections being detachably connected, worm wheels secured to the axle sections, worms meshing with the worm wheel, and a driving connection between the worms for constraining them to rotate in opposite directions, the worm being journaled in the housing to move therewith.

CHARLES HENRY BROWN.